US008117255B2

(12) United States Patent
Kolb et al.

(10) Patent No.: US 8,117,255 B2
(45) Date of Patent: Feb. 14, 2012

(54) SYSTEMS AND METHODS FOR SMART CLIENT REMOTE DATA MONITORING

(75) Inventors: Martin Kolb, Hambrücken (DE); Ulrich Roegelein, Gelberg (DE)

(73) Assignee: SAP AG, Walldorf (DE)

( * ) Notice: Subject to any disclaimer, the term of this patent is extended or adjusted under 35 U.S.C. 154(b) by 988 days.

(21) Appl. No.: 11/219,668

(22) Filed: Sep. 7, 2005

(65) Prior Publication Data
US 2007/0055769 A1 Mar. 8, 2007

(51) Int. Cl.
*G06F 15/16* (2006.01)
*G06F 15/173* (2006.01)
*G06F 9/44* (2006.01)

(52) U.S. Cl. ........ 709/203; 709/223; 709/224; 709/225; 709/226; 709/227; 717/124

(58) Field of Classification Search .................. 709/203, 709/223, 224, 225, 226, 217, 324, 245, 246, 709/227; 704/104.1; 395/200, 219, 339, 395/200.33; 717/124
See application file for complete search history.

(56) References Cited

U.S. PATENT DOCUMENTS

| | | | | |
|---|---|---|---|---|
| 6,018,619 A * | 1/2000 | Allard et al. | .................. | 709/224 |
| 6,119,165 A * | 9/2000 | Li et al. | .......................... | 709/229 |
| 6,263,456 B1 | 7/2001 | Boxall et al. | | |
| 6,345,315 B1 * | 2/2002 | Mishra | .......................... | 719/329 |
| 6,353,854 B1 * | 3/2002 | Cromer et al. | ................. | 709/224 |
| 6,532,497 B1 * | 3/2003 | Cromer et al. | ................. | 709/250 |
| 6,647,544 B1 | 11/2003 | Ryman et al. | | |
| 6,651,062 B2 * | 11/2003 | Ghannam et al. | ............... | 707/10 |
| 2003/0110264 A1 | 6/2003 | Whidby et al. | | |
| 2003/0221023 A1 * | 11/2003 | Peddada et al. | ............... | 709/330 |
| 2004/0093397 A1 | 5/2004 | Chiroglazov et al. | | |
| 2004/0139309 A1 | 7/2004 | Gentil et al. | | |
| 2004/0153997 A1 * | 8/2004 | Anderson et al. | ............. | 717/127 |
| 2005/0021712 A1 * | 1/2005 | Chassapis et al. | ............. | 709/223 |
| 2005/0071282 A1 * | 3/2005 | Lu et al. | .......................... | 705/64 |
| 2006/0026506 A1 * | 2/2006 | Kristiansen et al. | .......... | 715/517 |
| 2006/0075295 A1 * | 4/2006 | Pandharikar et al. | .......... | 714/13 |
| 2006/0190860 A1 * | 8/2006 | Ng et al. | ........................... | 716/4 |
| 2008/0244534 A1 * | 10/2008 | Golender et al. | ............. | 717/128 |

* cited by examiner

*Primary Examiner* — Pramila Parthasarathy
*Assistant Examiner* — Peter Shaw
(74) *Attorney, Agent, or Firm* — Finnegan, Henderson, Farabow, Garrett & Dunner LLP

(57) ABSTRACT

Embodiments consistent with the principles of the invention provide client-server application problem-solving capabilities at sites remote from the operational site by supplying server response data to a copy of the client-side application running at the remote site. The client-side application running at the remote site receives the same inputs as the operational site application, allowing application problems and behavior to be reproduced at the remote site. Debugging tools, expertise, and other resources may be more efficiently applied at the remote site to solve problems and explain behavior than would be the case at the operational site.

12 Claims, 8 Drawing Sheets

SYSTEMS AND METHODS FOR SMART CLIENT REMOTE DATA MONITORING

DESCRIPTION OF THE INVENTION

1. Field of the Invention

The present invention relates to debugging and customer support for computer applications, and more particularly to remotely debugging and providing customer support for computer applications on a networked client-server system.

2. Background

One of the biggest problems in producing most complex application programs is getting the last few errors, logical mistakes, flow of control problems, crashes, lockups, and glitches, i.e., bugs, out of the software. In a proper software development process, most bugs that can be reproduced in the developer's laboratory can be fixed, or debugged, quickly, typically in less than a day; and it is very rare for a reproducible bug to require more than a week to fix with the most advanced debugging tools.

Developers find it far more difficult to fix the bugs that occur at customer sites after an application is deployed, in part because these bugs are often intermittent and often occur only at the customer site. Because the developers cannot reproduce these problems in their own laboratory, they must guess what the problem is. After weeks of randomly rooting around in the software they may find and fix a similar but unrelated problem. Thinking that they have solved the problem, they ship a new version of the application to the customer. But when the customer discovers that the new version is no better, sometimes after waiting weeks for the supposed fix, the customer becomes very unhappy. And, when customers grow unhappy, business suffers.

Debugging and customer support may be even more difficult for distributed applications that run on a client-server architecture because the processing and reaction of the client application depends on the data provided by the server application, which often, in turn, depends upon the request sent by the client application. For example, consider FIG. 1, which is a diagram representing a client-server architecture. As shown, an application server 105 and a customer site client application 115 communicate via a network 110. During typical operation, customer site client application 115, sends requests to application server 105 and receives responses from application server 105. Thus, the state of customer site client application 115 at any time is a function of at least the user's inputs to its user interface, the preceding requests sent to application server 105, and the data in the responses received from application server 105. By the time a customer reports a bug, e.g., by telephone or email, the preceding application requests and responses have already occurred, and even if the customer can reproduce the problem, the developer handling the call is not at the developer's site to employ software development tools or other assets to debug it.

One solution for fixing application bugs that occur at a customer site is to talk with the customer to gather data on the conditions under which the problem occurred, and then try to reproduce and debug the problem in the developer's lab. Very often, however, the developers cannot reproduce a bug in the laboratory, even when it is reproducible and not unique to the customer site, because the customer does not or cannot tell the developers everything that they did. To address this problem, some applications keep logs of their activities and include modules that allow developers to record, upload, and examine everything that the customer did with the application, eliminating the need to rely on reports from the customer. Debugging from log files, however, is a usually a very difficult, inefficient and time-consuming task.

Another solution for fixing application bugs that occur at a customer site is to put a remote control application on the customer's computer that allows a developer in a lab to see the desktop of a remote machine and control it with the local mouse and keyboard, just as if they were sitting in the front of the customer's computer, such as TightVNC™ or pcAnywhere™. Such "dump and display" tools, however, are little more efficient and effective than log files for debugging, in part because the developer only has access to what is displayed on the screen, and not the underlying data and objects.

In a similar solution, a developer may put a remotely controlled debugger on the customer's computer that allows the developer to debug the application while it is running at the customer's site from the computers in the developer's lab. There are several drawbacks to this approach, however, not the least of which being that many customers will not allow remote third-party access to their computer systems because the systems contain sensitive information unrelated to the application or because they fear that the debugging process may cause a system crash, among other things.

Yet another solution for fixing application bugs that occur at a customer site is to send developers into the field, i.e., to the customer site, to fix the problems. One drawback to this solution is that bugs that only manifest themselves after days or weeks require a long time to pin down. And, it is especially difficult to fix bugs that manifest themselves in a different way every time. In fact, according to one source, the process of tracking down intermittent application failures at customer sites may consume 20% to 50% of a typical software development schedule. Other drawbacks to this approach include customers' reluctance to allow developers potential access to sensitive information unrelated to the application and fear that the debugging process may cause a system crash, among other things.

In addition to debugging, customers also demand other types of support for deployed software applications. Even when a deployed application does not have bugs, customers may misuse an application, misinterpret its outputs, or misunderstand its controls and operation, causing them to report problems to the application developers. To determine the cause of such "problems," developers typically engage the same or similar solutions to the debugging solutions described above and suffer similar drawbacks. Because the developer (or other troubleshooter) cannot see the customer's user interface, observe the operations that preceded the "problem," or see the data and objects related to the outward manifestation, it is difficult to determine whether there is truly a bug in the code or a customer error or misunderstanding, especially from a remote site. This is especially true in the initial phases of application deployment and customer support, before customers gain familiarity with a new application or a new version of an old application.

Accordingly, it is desirable to provide improved systems and methods for debugging and providing customer support for computer application deployed at a remote customer site.

SUMMARY OF THE INVENTION

In accordance with the invention, one embodiment provides systems, methods and apparatuses for remote data monitoring in a client-server application comprising: a first client that runs a client application for processing business objects, sends a client request, and receives a server response that includes a business object; a second client that runs a copy of the client application for processing business objects and receives a copy of the server response that includes the business object; and a server, communicatively connected to a first client and a second client, that receives the client request, sends the server response that includes the business object to the first client, and sends the copy of the server response that includes the business object to the second client; wherein the second client uses the copy of the server response to solve a problem associated with the client application for processing business objects.

Another embodiment consistent with the invention provides systems, methods, and apparatuses for remote data monitoring in a client-server application comprising: a server that receives a client request and sends a server response that includes the business object; a first client, communicatively connected to the server, that runs a client application for processing business objects, sends the client request, receives the server response that includes the business object, and sends a copy of the server response that includes a business object; a second client, communicatively connected to the first client, that runs a copy of the client application for processing business objects and receives the copy of the server response that includes the business object; wherein the second client uses the copy of the server response to solve a problem associated with the client application for processing business objects.

Another embodiment consistent with the invention provides systems, methods, and apparatuses for remote data monitoring with a client-server application comprising means and operations for receiving a remote monitoring enable signal; receiving a request from a requesting client; transmitting a response to the requesting client; and transmitting the response to a remote client for use by the remote client, wherein the remote client is remotely located from the requesting client.

Yet another embodiment consistent with the invention provides systems, methods, and apparatuses for remote data monitoring with a client-server application comprising means and operations for: receiving a user input to enable a remote monitoring function; transmitting a client request to a server from a requesting client; receiving a server response; and transmitting the server response to a remote client for use by the remote client, wherein the remote client is remotely located from the requesting client.

Additional advantages of the invention will be set forth in part in the description which follows, and in part will be obvious from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DESCRIPTION OF EMBODIMENTS

Reference will now be made in detail to exemplary embodiments of the invention, examples of which are illustrated in the accompanying drawings. Wherever convenient, similar reference numbers will be used throughout the drawings to refer to the same or like parts.

Figure 2:
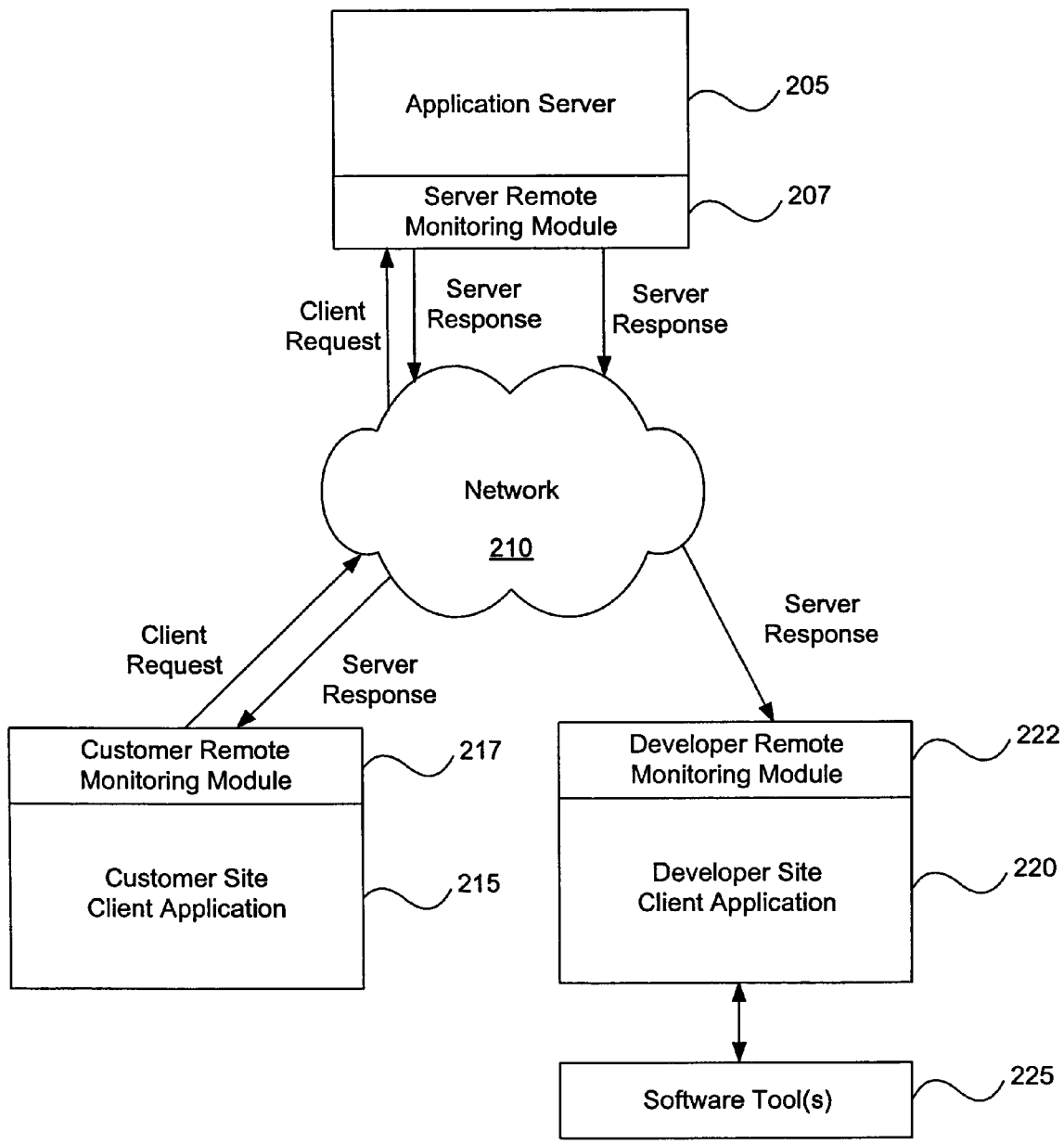
FIG. 2 is a diagram representing a client-server architecture consistent with one embodiment of the invention.

FIG. 2 is a diagram representing a client-server architecture consistent with one aspect of the invention. In the embodiment shown, an application server 205 communicates with a customer site client application 215 and a developer site client application 220 via a network 210. The software running on application server 205 includes a server remote monitoring module 207 that sends duplicate server responses to both customer site client application 215 and developer site client application 220. As represented in the diagram, developer site client application 220 is physically remote from customer site client application 215.

Customer site client application 215 includes a customer remote monitoring module 217 that is used to activate server remote monitoring module 207 such that it transmits server responses to both customer site client application 215 and developer site client application 220. If server remote monitoring module 207 is not activated, application server 205 transmits server responses only to customer site client application 215. In the embodiment shown, there may be no direct communication between customer remote monitoring module 217 and developer remote monitoring module 222.

Developer site client application 220 includes a developer remote monitoring module 217 that is used to receive server responses from server remote monitoring module 207. Thus, a client request from customer site client application 215 to application server 205 will cause application server 205 to send a server response to customer site client application 215 and to developer site client application 220, and developer site client application 220 will experience the same operational inputs as customer site client application 215.

In one implementation, the client request is not actively sent to the developer site client application 220. In such an implementation, information about the client request may be extracted using the monitoring tools of application server 205. In another implementation, the client request is sent (not shown) to the developer remote monitoring module 222, which will accept it although a client application alone could not normally receive a client request meant for a server. Similarly, a client application, such as developer site client application 220 could not normally receive a server response without having first sent a client request—the client application typically sends a request and then opens a socket for receiving a server response—so developer remote monitoring module 222 includes the ability to receive an unexpected response, e.g., to open a socket without a prior request having been sent.

In yet another implementation, customer remote monitoring module 217 may be omitted. In this implementation, the monitoring process may be initiated at the application server 205, replacing the function of customer remote monitoring module 217 to turn on the monitoring process. It may be more convenient, however, to have the switch for turning on the monitoring at the customer site client application 215 as shown in FIG. 2. Otherwise, the system would need a server administrator to turn the monitoring on.

In one implementation, the developer client site application 220 does not know the content of the client request. In this implementation, it is assumed that the content of the request, which may be useful for debugging some problems, is gathered from the monitoring facilities of application server 205, for example, using software tools 225. In another implementation, server remote monitoring module 207 may send (not shown) received client request data, along with the server response data, to the developer client site application 220.

One of ordinary skill will recognize that "developer site" is just a convenient label representing any site remote from the customer site, including a consultant's site, a call center's site, and a customer's IT department's site, among others.

Also located at the developer's site is a software tool(s) 225, such a debugger, tracer, log file analyzer, suite of debugging tools, or other tools both known and unknown in the art, used to help debug, troubleshoot, or otherwise solve problems in conjunction with developer site client application 220, or to train in the use of customer site client application 215 under actual operating and usage conditions. In one embodiment consistent with the invention, developer site client application 220 is a copy of customer site client application 215. Consequently, any problems found with developer site client application 220 will be duplicates of problems that occur in customer site client application 215, and any solutions developed by debugging and troubleshooting developer site client application 220 can be applied to customer site client application 215. Since the developer's site includes debugging and other tools, developer site client application 220 may be run in debug mode, or other debugging measures may be taken, to help solve problems.

In one embodiment consistent with the invention, application server 205 supplies complex objects having semantical information to the client, not merely text and graphical objects for rendering. For example, the client-server system may be a business system, such as an enterprise resource planning system like the SAP R3™ system, and a server response may include one or more specialized business objects containing business data and semantical information. A client application, such as customer site client application 215 and developer site client application 220, is designed to interpret, understand, and process the business objects, including associated metadata, in order to perform its functions. A business object is a collection of data that belongs to a specific business task, not merely a set of primitives. For example, for an application dealing with sales order processing there may be a collection of data for the business object "sales order," and this collection of data is complex and interrelated. Each portion of the data belonging to a business object may be simple (e.g., the information about a "order creation date") or it may be quite complex in itself, involving a data structure(s) (e.g., a list of "sales order items", each list entry including detailed information about each item). Thus, a server response may contain high-level business objects, such as an object representing a requested purchase order or invoice, and included in the business object data may be metadata. For example, the server response may contain "display hints" metadata that inform a client application how to display in the business data in the business object(s). A display hint, and business object metadata in general, may be very abstract. For example, a display hint may be the equivalent of "display sales order object inside a form" or "display sales order items in a tabular manner," as opposed to a specific display instruction like "display a button with text 'OK' at position 20,40."

Using business objects, a client application can be remotely debugged at the business level as well as the code level by a consultant or other knowledgeable person who understands the business processes and objects implemented by the client-server application. For example, an application customer may telephone for support because the "enter order" button on an application display interface becomes disabled after the customer performs a series of operations, and the customer does not understand why. Using the remote monitoring capability, the consultant can have the customer recreate the series of operations while running the same client application and receiving the same server responses at the consultant's site. The consultant can then use remote site tools, manuals, expert personnel, etc. to answer the customer question. In this example, the consultant may be able to determine, for instance, that one of the operations in the series of operations entered an order into the system, so the "enter order" button was properly disabled from that point on, and the application was functioning correctly.

Figure 1:
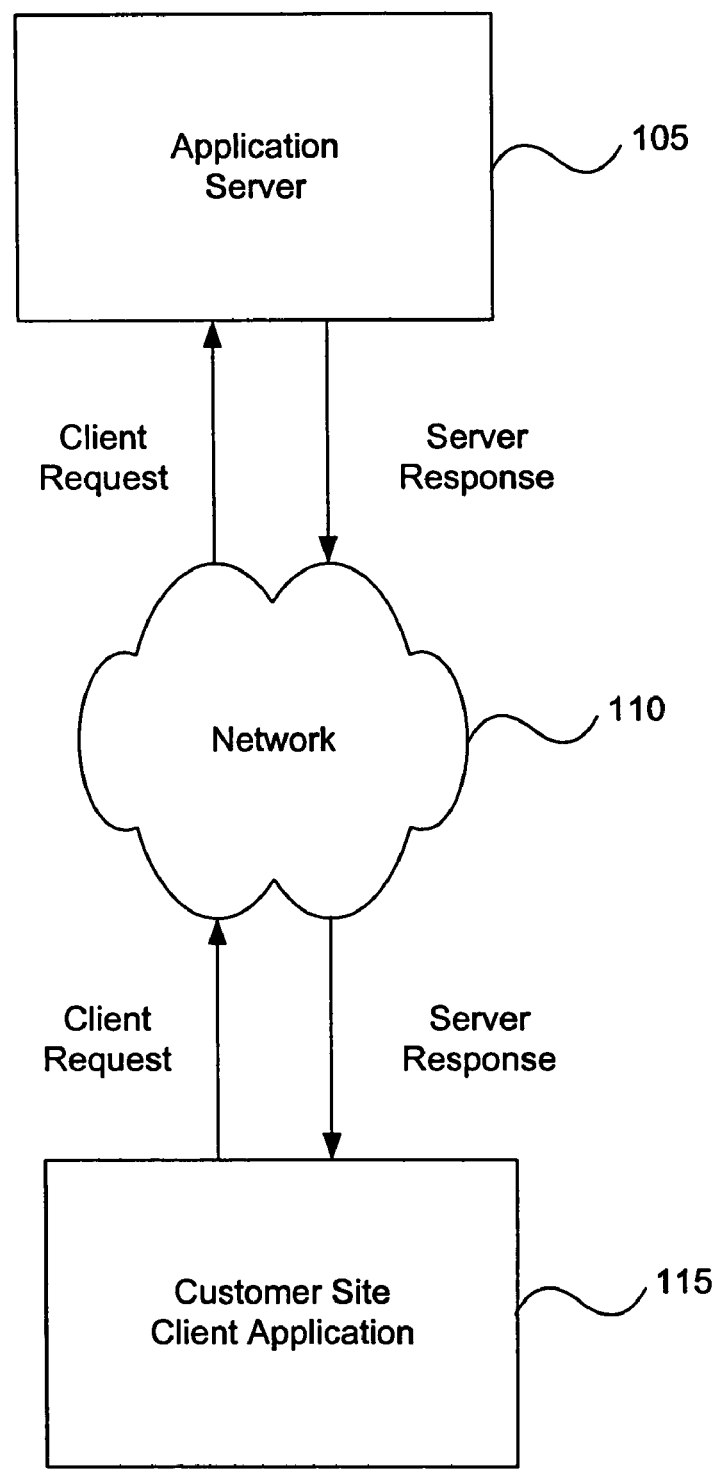
FIG. 1 is a diagram representing a client-server architecture.

In one embodiment consistent with the invention, server remote monitoring module 207, client remote monitoring module 217, and developer remote monitoring module 222 are added onto an existing client-server application to give the application remote monitoring/debugging/problem-solving capability. As can be seen in comparison with FIG. 1, both the server and the client application are modified in this embodiment, i.e. the client is a "smart" client. In another embodiment consistent with the invention, the functions of server remote monitoring module 207 and client remote monitoring module 217 are designed into a new client-server application from scratch.

Figure 3:
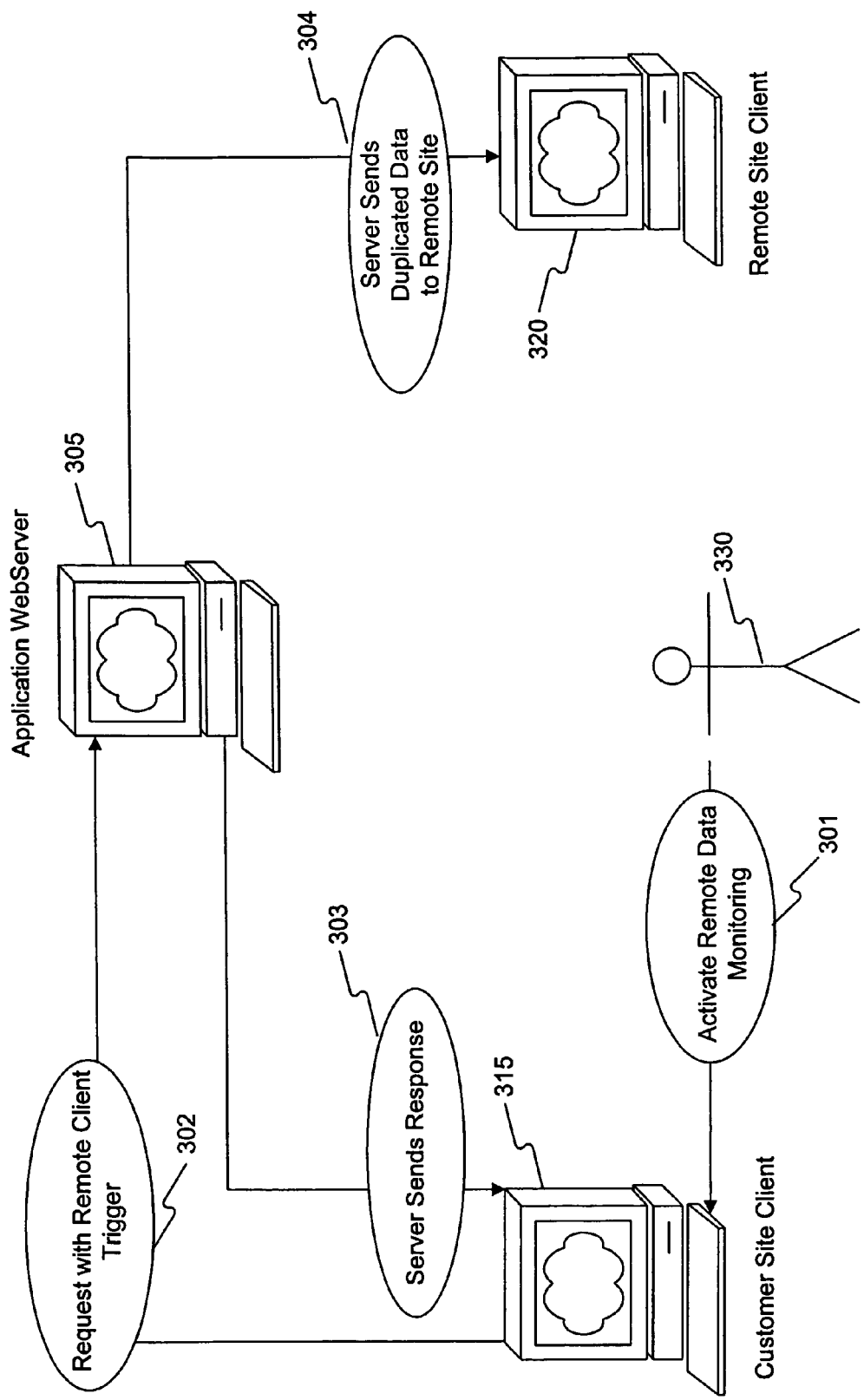
FIG. 3 is a diagram representing a client-server architecture and messaging consistent with one embodiment of the invention.

FIG. 3 is a diagram representing a client-server architecture and messaging consistent with the principles of the invention. As shown, an application webserver 305 is communicatively connected with a customer site client 315 and a remote site client 320. A user 330 operates customer site client 315.

During operation, user 330 inputs a command to customer site client 315 to activate the remote data monitoring capability 301 of the client-server application. Customer site client 315 then transmits a request with a remote client trigger 302 to application webserver 305. After receiving the request, application webserver 305 sends a response 303 to customer site client 315. At about the same time or shortly thereafter, application webserver 305 also sends a duplicate response with the same data 304 to remote site client 320.

Figure 4:
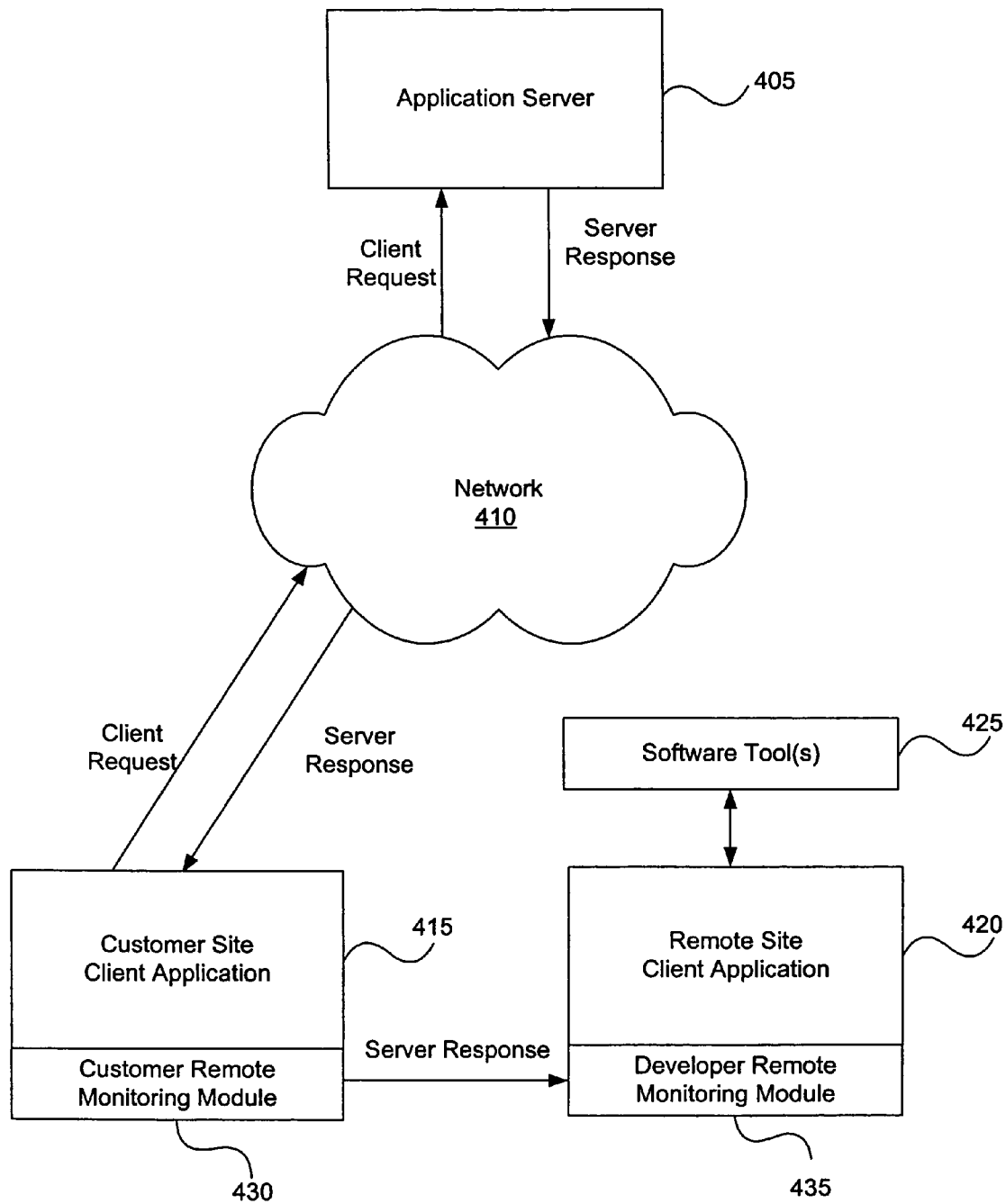
FIG. 4 is a diagram representing a client-server architecture consistent with one embodiment of the invention.

FIG. 4 is a diagram representing an exemplary client-server architecture consistent with the principles of the invention. In the embodiment shown, an application server 405 communicates with a customer site client application 415 via a network 410. This portion of the architecture is known in the art, and the exact implementation is not critical to the invention.

Customer site client application 415 includes a customer remote monitoring module 430 that transmits copies of server responses received from application server 405 to remote site client application 420. In one embodiment consistent with the invention, server remote monitoring module 430 may be disabled such that copies of server responses are not always sent to remote site client application 420.

Remote site client application 420 includes a developer remote monitoring module 435 that is used to receive copies of server responses from customer remote monitoring module 430. In the implementation shown, the client request is not sent directly to the developer remote monitoring module 435. In another implementation, the client request may be sent to the developer remote monitoring module 435. In either case, a client request from customer site client application 415 to application server 405 will result in application server 405 reacting by sending a server response to customer site client application 415, and customer site client application 415 will then send the server response to remote site client application 420. One of ordinary skill will recognize that "remote site" is a label representing any data processing system not co-located with the data processing system used by the customer to run the client application, including a consultant's site, a call center's site, or a customer's IT department's site, among others. One of ordinary skill will also recognize that the communications path between customer remote monitoring module 430 and developer remote monitoring module 435 is shown as being independent of network 410 for clarity, and that the communications path could include network 410 or any other network.

Also located at the remote site is a software tool(s) 425, such a debugger, tracer, log file analyzer, online manual, or other tool known or unknown in the art. Such software tools may used to help debug, troubleshoot, or otherwise solve problems in conjunction with developer site client application 420. Since the developer's software tool(s) are located at the developer's site on the developer's computers, there are no licensing restrictions against installing and using them as may be the case at a customer's site. In one embodiment consistent with the invention, remote site client application 420 is a copy of customer site client application 415. Consequently, any problems found with remote site client application 420 will be duplicates of problems that occur in customer site client application 415, and any solutions developed by debugging and troubleshooting remote site client application 420 can be applied to customer site client application 415.

In one embodiment consistent with the invention, the customer site host computer and the developer site host computer may be running different operating systems, although the client application is the same on each. This embodiment may be so configured purposely, so as to test whether the operation of the client application is the same under different operating systems.

In the embodiment shown in FIG. 4, customer remote monitoring module 430 and developer remote monitoring module 420 are added onto an existing client-server application to give the application remote monitoring/debugging/ problem-solving/training capability. As can be seen in comparison with FIG. 1, the client applications are modified in this embodiment, i.e. the client is a "smart" client, while the server application is not. In another embodiment consistent with the invention, the functions of customer remote monitoring module 430 and developer remote monitoring module 435 are designed into the client-side application from scratch.

Figure 5:
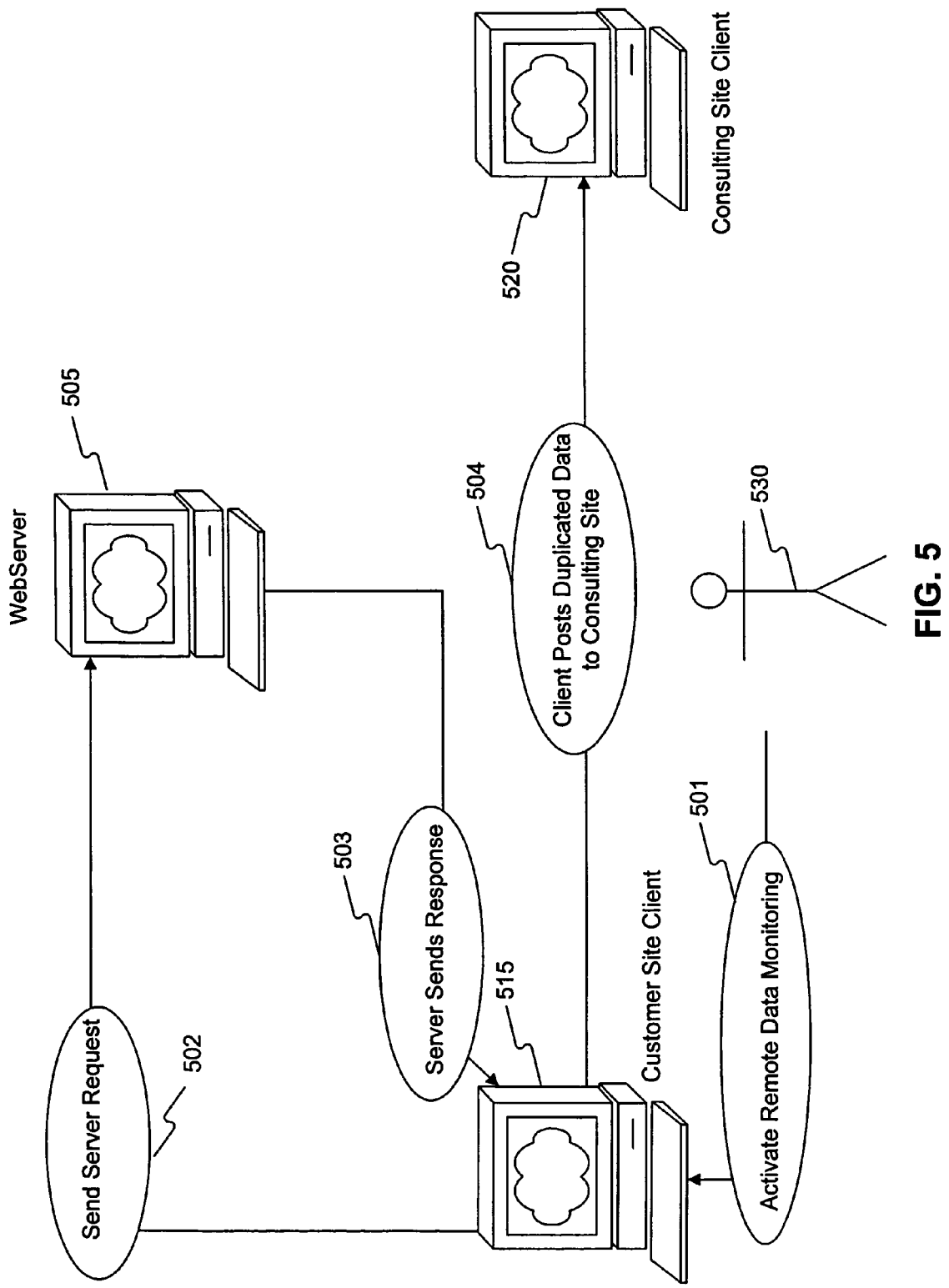
FIG. 5 is a diagram representing a client-server architecture and messaging consistent with one embodiment of the invention.

FIG. 5 is a diagram representing a client-server architecture and messaging consistent with the principles of the invention. As shown, an application webserver 505 is communicatively connected with a customer site client 515. Customer site client 515 is communicatively connected with a consulting site client 520. A user 530 operates customer site client 515.

During operation, user 530 inputs a command to customer site client 515 to activate the remote data monitoring capability 501 of the client-server application. During normal operation, customer site client 515 transmits a server request 502 to application webserver 505. After receiving the request, application webserver 505 sends a response 503 to customer site client 515. After receiving the response 503, customer site client 515 sends data duplicating the response data 504 to consulting site client 520. Thus, both customer site client 515 and consulting site client 520 receive the same data from application webserver 505.

Figure 6:
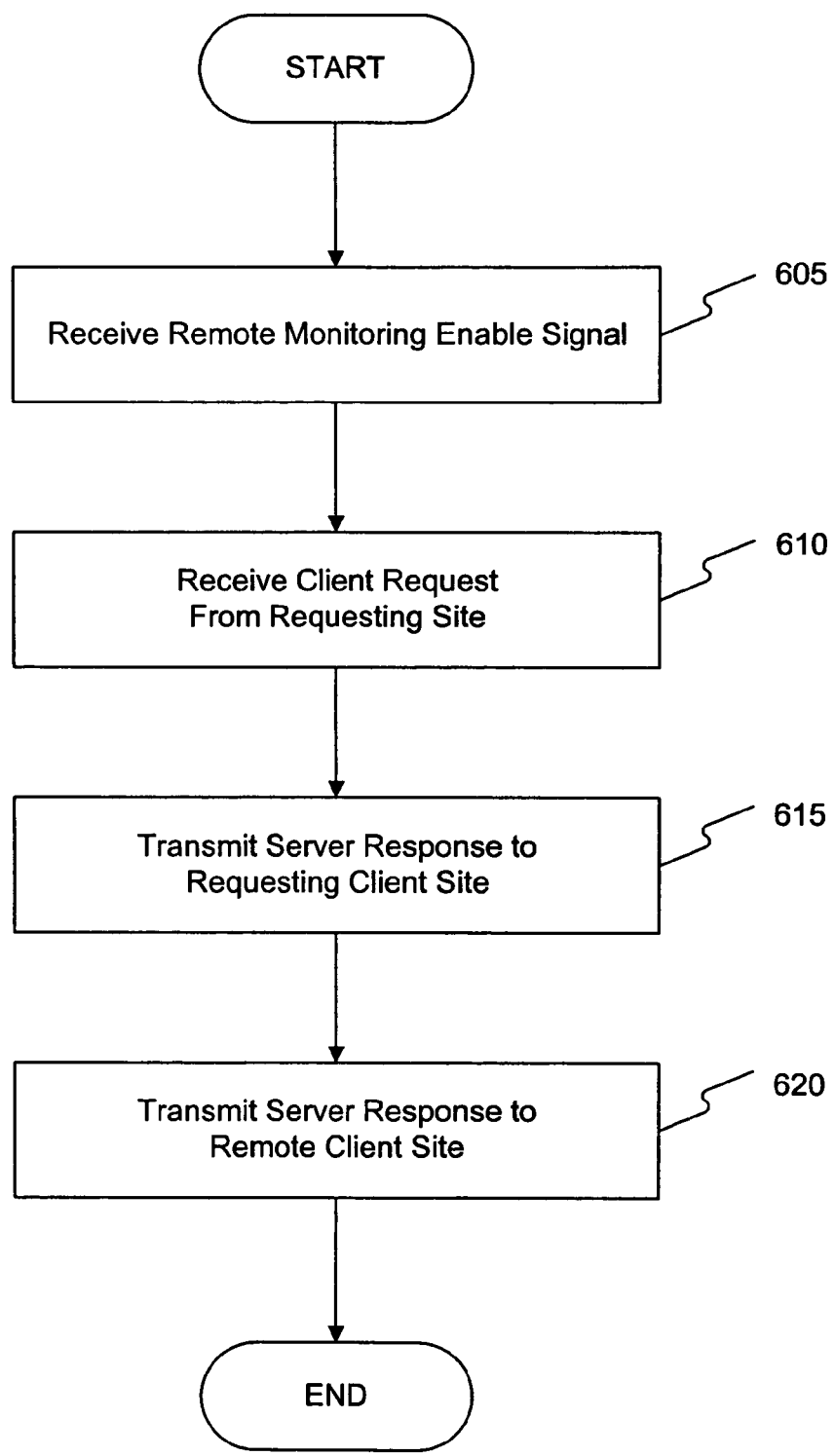
FIG. 6 is a flowchart of an exemplary server process consistent with one implementation of the invention.

FIG. 6 is a flowchart of an exemplary server process consistent with one implementation of the invention. The process may be implemented wholly or partly using data-processing hardware, software, manual operations, or some combination of these in, for example, in a server such as application server 205 shown in FIG. 2. As shown in FIG. 6, the process begins by receiving a remote monitoring enable signal (step 605). In this implementation, the remote monitoring capability may be disabled and enabled according to the remote monitoring enable signal. For example, a software application customer may enable remote monitoring after a problem is encountered, so that the problem may be reproduced, diagnosed, debugged, observed, resolved, etc. using a remote facility, such as the application vendor's laboratory or a consultant's site. In such an implementation, remote monitoring may be turned off when there is no problem to solve. In one embodiment, the remote monitoring enable signal also contains the machine address of the remote client site, such as a developer site 220. This address is used by remote monitoring module 207 to send the duplicate server response. In some embodiments, this machine address may also be used for sending the client request information to the remote client site.

Next, the process receives a client request from the requesting site (step 610). In one implementation, the client request is typical of those known in common client-server applications and systems.

In response, the process transmits a server response to the client site that sent the client request (step 615). In one implementation, the server response includes business object(s), such as those typical of enterprise resource planning client-server applications and systems.

In addition, the server process also transmits the server response to a remote client site other than the requesting site (step 620), such as the application developer's laboratory or a consultant's laboratory. As noted above, the remote monitoring enable signal may contain the machine address of the remote client site for sending the copy of the server response. Thus, the remote client site receives the same data from the server as the requesting client site.

Figure 7:
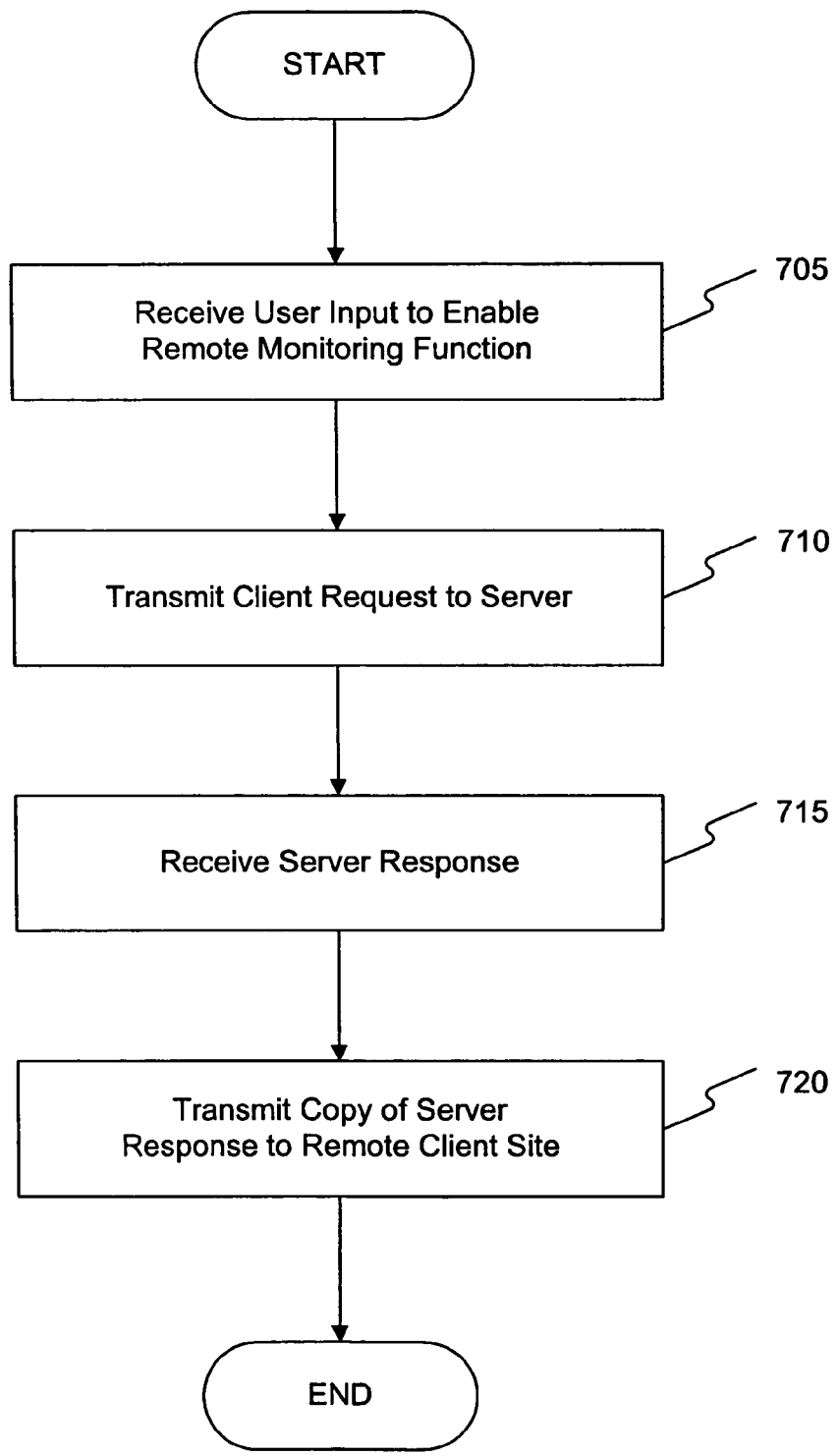
FIG. 7 is a flowchart of an exemplary client process consistent with one implementation of the invention.

FIG. 7 is a flowchart of an exemplary client process consistent with one implementation of the invention. The process may be implemented wholly or partly using data-processing hardware, software, manual operations, or some combination of these in, for example, a client such as customer site client application 415 shown in FIG. 4. As shown in FIG. 7, the process begins by receiving a user input to enable the remote monitoring function (step 705). In this implementation, the user may turn on or off the remote monitoring capability as desired. For example, for every-day operation of the client-server application, there may be no need to enable remote monitoring.

Next, the process transmits a client request to the server (step 710). In one implementation, the client request is typical of those known in common client-server applications and systems, such as, for example, data requests to a database server that occur during normal operation of a client-server application.

The process then receives a server response from the server (step 715). In one implementation, the server response includes a business object(s).

The process next transmits a copy of the server response to a remote client site (step 720). Thus, the remote client site receives the same data from the server as the requesting client site. Because it receives the same inputs as the requesting client site, the remote client site may more easily reproduce, diagnose, debug, observe, resolve, etc. any problems encountered by the client application. In one implementation consistent with the invention, the process transmits a set of data derived from the server response instead of a copy. In other implementations, the process may send either a copy or a set of the data from the server response.

Figure 8:
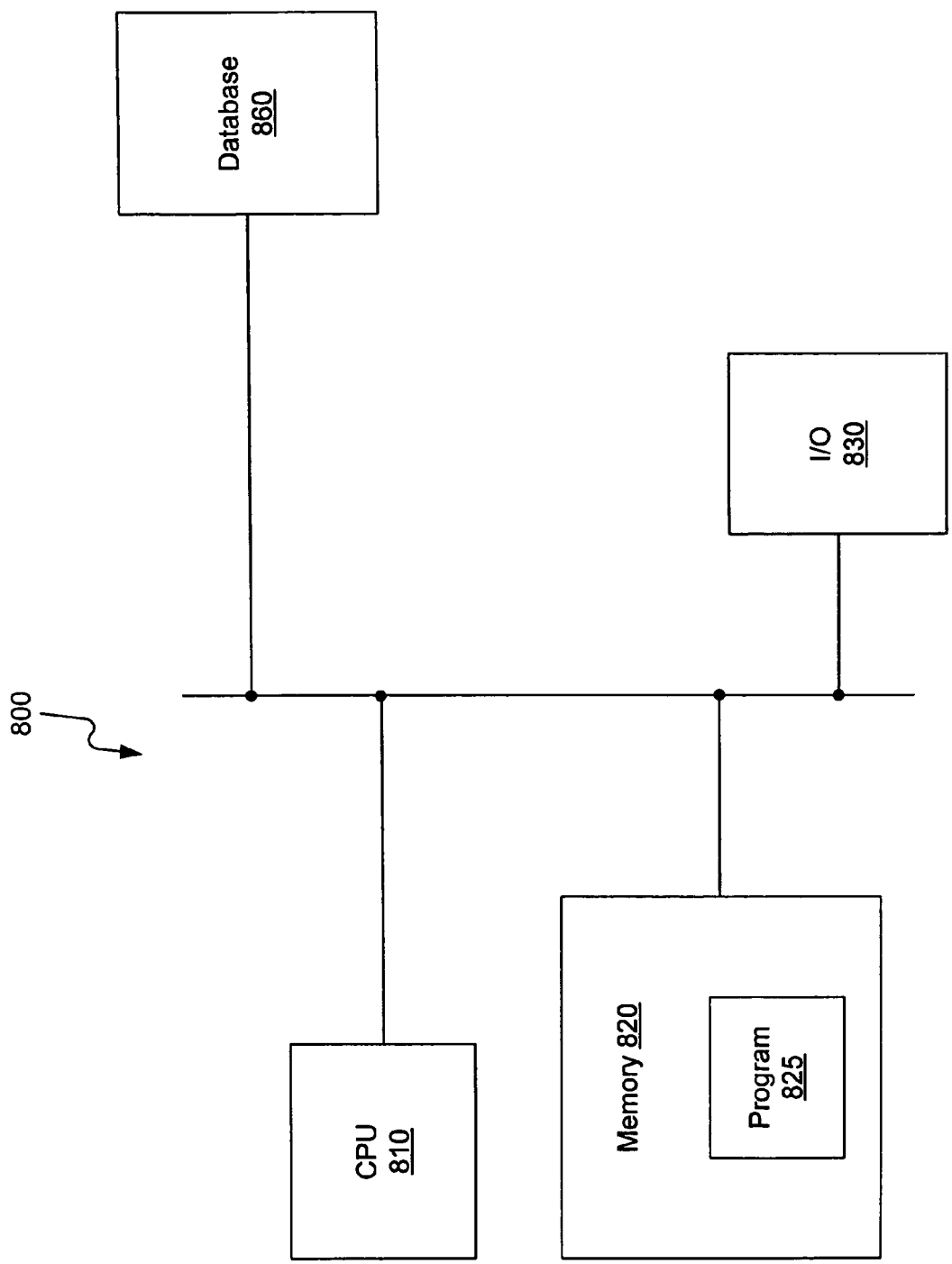
FIG. 8 illustrates an exemplary computing system that can be used to implement embodiments of the invention.

FIG. 8 illustrates an exemplary computing system 800 that can be used to implement embodiments of the invention. The components and arrangement, however, are not critical to the present invention.

System 800 includes a number of components, such as a central processing unit (CPU) 810, a memory 820, an input/output (I/O) device(s) 830, and a database 860 that can be implemented in various ways. For example, an integrated platform (such as a workstation, personal computer, laptop, etc.) may comprise CPU 810, memory 820 and I/O devices 830. In such a configuration, components 810, 820, and 830 may connect through a local bus interface and access to database 860 (implemented as a separate database system) may be facilitated through a direct communication link, a local area network (LAN), a wide area network (WAN) and/or other suitable connections. For another example, system 800 may be part of a larger client-server system.

CPU 810 may be one or more known processing devices, such as a microprocessor from the Pentium family manufactured by Intel™. Memory 820 may be one or more storage devices configured to store information used by CPU 810 to perform certain functions related to embodiments of the present invention. Memory 820 may be a magnetic, semiconductor, tape, optical, or other type of storage device. In one embodiment, memory 820 includes one or more programs 825 that, when executed by CPU 810, perform various processes consistent with the present invention. For example, memory 820 may include a remote monitoring application, a client application that includes a remote monitoring module, or a server application that includes a remote monitoring module. Memory 820 may also include other programs that perform other functions, such as a debugger program.

Methods, systems, and articles of manufacture consistent with the present invention are not limited to programs configured to perform dedicated tasks. For example, memory 820 may be configured with a program 825 that performs several functions when executed by CPU 810. For example, memory 820 may include an application program that incorporates the functions of client application and a debugging application. Alternatively, CPU 810 may execute one or more programs located remotely from system 800. For example, system 800 may access one or more remote programs that, when executed, perform functions related to embodiments of the present invention.

Memory 820 may be also be configured with an operating system (not shown) that performs several functions well known in the art when executed by CPU 810. By way of example, the operating system may be Microsoft Windows™, Unix™, Linux™, an Apple Computers operating system, Personal Digital Assistant operating system such as Microsoft CE™, or other operating system. The choice of operating system, and even to the use of an operating system, is not critical to the invention.

I/O device(s) 830 may comprise one or more input/output devices that allow data to be received and/or transmitted by system 800. For example, I/O device 830 may include one or more input devices, such as a modem, network connection, keyboard, touch screen, mouse, and the like, that enable data to be input, including data from a user. Further, I/O device 830 may include one or more output devices, such as a modem, network connection, display screen, CRT monitor, LCD monitor, plasma display, printer, speaker devices, and the like, that enable data to be output or presented, including presentation to a user. The configuration and number of input and/or output devices incorporated in I/O device 830 are not critical to the invention.

Database 860 may comprise one or more databases that store information and are accessed and/or managed through system 800. By way of example, database 860 may be an Oracle™ database, a Sybase™ database, or other relational database, or database 860 may be part of a central product validation system. Systems and methods of the present invention, however, are not limited to separate databases or even to the use of a database, and can include systems that use data from practically any source, such as the internet and other organized collections of data, or memory systems.

One of ordinary skill in the art will recognize that the embodiments described and suggested above can be implemented using conventional equipment and programming techniques.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for remote data monitoring with a client-server application comprising:
    receiving at a customer remote monitoring module of a first client a remote monitoring enable signal, the first client running a client application of the client-server application;
    activating by the first client a monitoring function in response to the remote monitoring enable signal;
    sending a request from the first client to a server running a server application of the client-server application;
    receiving, by the first client, a response to the request from the server, the response including a complex object to be processed by the first client ;
    transmitting the response to the request to a developer remote monitoring module of a second client for use by the second client when the monitoring function is activated, wherein the second client runs a copy of the client application of the client-server application;
    troubleshooting at the second client a problem of the client-server application running on the first client by replicating the problem on the second client by updating a state of the copy of the client-server application using the response to the request transmitted to the second client; and
    applying, by the first client, a solution received from one of the server or the second client so as to solve the problem.

2. The method for remote data monitoring of claim 1, wherein the complex object comprises: a business object.

3. The method for remote data monitoring of claim 1, wherein the remote monitoring enable signal comprises:
    a network address of the second client; and
    wherein transmitting the response to the developer remote monitoring module of the second client comprises:

transmitting the response to the network address of the second client.

4. The method of claim 1 wherein the problem of the client-server application includes a bug in the client-server application, a customer misuse of the client-server application, a misinterpretation of the client-server application outputs, or a misunderstanding of the control or operation of the client-server application.

5. An apparatus for monitoring a client-server application comprising:
- a processor configured to execute a client application of the client-server application, activate a monitoring operation in response to a remote monitoring enable signal, and generate a request to be sent to a server running a server application of the client-server application;
- a receiver configured to, in response to the request, receive the remote monitoring enable signal and receive a server response from the server;
- a transmitter configured to transmit the request from a requesting client to the server;
- a customer remote monitoring module transmitting the response received from the server to a remote client running a copy of the client application when the monitoring function is activated by the processor, wherein:
    the remote client troubleshoots a problem of the client-server application running on the requesting client by replicating the problem on the remote client by updating the state of the copy of the client-server application using the response to the request from the requesting client transmitted to the remote client; and
    the processor further applies a solution received from one of the server or the remote client for solving the problem.

6. The apparatus of claim 5, wherein the complex object comprises: a business object.

7. An apparatus for remote data monitoring within a client-server architecture comprising:
- a user input component configured to receive a user input to enable a remote monitoring function at a client running a client application of a client-server application;
- a transmitter configured to transmit a client request to a server running a server application of the client-server application;
- a receiver configured to receive a server response including a complex object;
- a processor configured to create the client request based on the user input, generate the client request, run the client application of the client-server application to process the server response, and enable the remote monitoring function at the client in response to the user input; and
- a customer remote monitoring module configured to transmit the server response, including the complex object, to a remote client for use by the remote client, when the remote monitoring function is enabled, wherein
    the remote client runs a copy of the client application of the client-server application, and
    the remote client troubleshoots a problem of the client-server application by replicating the problem on the remote client by updating the state of the copy of the client application using the server response transmitted to the remote client by the customer remote monitoring module; and
    the processor further applies a solution received from one of the server or the remote client for solving the problem.

8. The apparatus of claim 7, wherein the customer remote monitoring module is disposed within the transmitter.

9. The apparatus of claim 7, wherein the server response comprises:
    a set of data derived from the server response for use by the remote client.

10. The apparatus of claim 7, wherein the complex object comprises: a business object.

11. The apparatus of claim 7, wherein the customer remote monitoring module further transmits a copy of the client request to the remote client.

12. A system for remote data monitoring in a client-server application comprising:
- a first client running a client application for processing business objects, the first client sending a client request to a server, receiving a remote monitoring enable signal, and receiving, from the server, a server response that includes a business object, the first client including a customer remote monitoring module, when the first client activates a monitoring function in response to the remote monitoring enable signal, sending to a second client a copy of the server response including the business object;
- the second client running a copy of the client application for processing the business object, the second client including a developer remote monitoring module receiving the copy of the server response from the first client; and
- the server, communicatively connected to the first client, running a server application, receiving the client request from the first client, and sending in response to the client request the server response to the first client, wherein:
    the second client uses the copy of the server response to troubleshoot a problem of the client application running on the first client for processing business objects by replicating the problem by updating the state of the copy of the client application using the copy of the server response; and
    the first client applies a solution received from one of the server or the second client so as to solve the problem.

* * * * *